United States Patent [19]

Kozai et al.

[11] Patent Number: 4,495,464
[45] Date of Patent: Jan. 22, 1985

[54] NON-CONTACTING, SPEED-DETECTING DEVICE OF A DIRECT-CURRENT GENERATOR TYPE

[75] Inventors: Yoshinori Kozai, Hino; Yoichi Amemiya, Hachioji; Noboru Iwamatsu, Hino, all of Japan

[73] Assignee: Fujitsu Fanuc Limited, Hino, Japan

[21] Appl. No.: 380,747

[22] PCT Filed: Sep. 17, 1981

[86] PCT No.: PCT/JP81/00234
§ 371 Date: May 13, 1982
§ 102(e) Date: May 13, 1982

[87] PCT Pub. No.: WO82/01074
PCT Pub. Date: Apr. 1, 1982

[30] Foreign Application Priority Data

Sep. 22, 1980 [JP] Japan ............... 55-130585

[51] Int. Cl.³ .................. G01P 3/48; G01P 3/54
[52] U.S. Cl. .................................................. 324/174
[58] Field of Search .................. 324/174, 173, 166; 340/672; 318/328; 310/156

[56] References Cited

U.S. PATENT DOCUMENTS 3,188,620  6/1965  MacCallum ............... 324/174 X
3,447,034  5/1969  Smith ........................ 324/174 X
3,548,663 12/1970  Radin ......................... 324/174 X

FOREIGN PATENT DOCUMENTS 0569948  8/1977  U.S.S.R. ..................... 324/173

OTHER PUBLICATIONS

Clark, Rotary Tachometer/Encoder, IBM Technical Disclosure Bulletin, Feb. 1976, p. 2787.

Primary Examiner—Stanley T. Krawczewicz
Attorney, Agent, or Firm—Armstrong, Nikaido, Marmelstein & Kubovcik

[57] ABSTRACT

In a non-contacting, speed-detecting device of a DC generator type; comprising a cylindrical permanent magnet rotor 1 having N and S poles distributing alternatingly in the circumferential direction, a stator 2 facing said rotor 1 in which stator output windings 4 are wound, a permanent magnet 3 for location rotating coaxially with the rotor 1, and magnetic induction switches 5 positioned close to the circumference of the magnet 3; switching the flat portions of the multi-phase trapezoid AC signals generated in the output windings by switches 5 in response to the rotating position of the magnet 3 for location; and obtaining a DC voltage proportional to the speed; the S pole regions and the N pole regions of the magnet 3 for location are formed continuously so that the magnetic field is inverted steeply from one polarity to another polarity, and the ratio of the width of the S pole regions and the width of the N pole regions is selected to be a value other than one, whereby only the flat portions of the multi-phase trapezoid AC signals generated in output windings are switched exactly without being influenced by the variation of the operating level of the switches 5 and a rippleless DC voltage is obtained.

5 Claims, 11 Drawing Figures

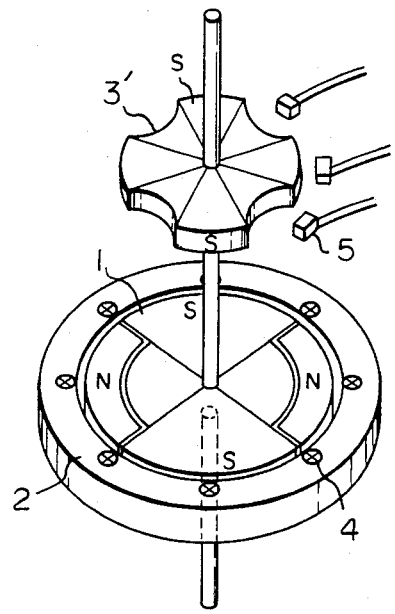
Fig. IA PRIOR ART
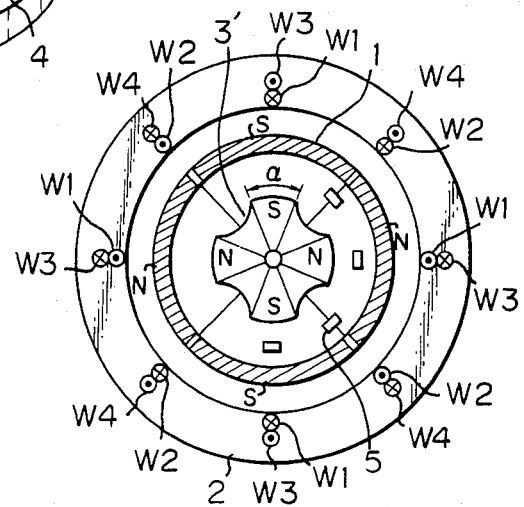
Fig. IB PRIOR ART
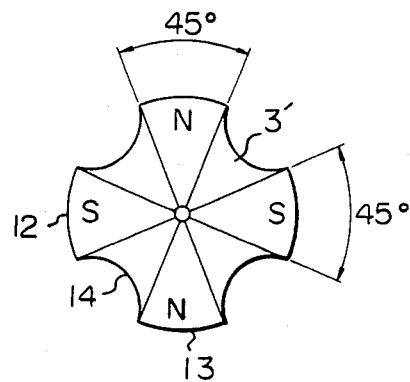
Fig. IC PRIOR ART

Fig. 3
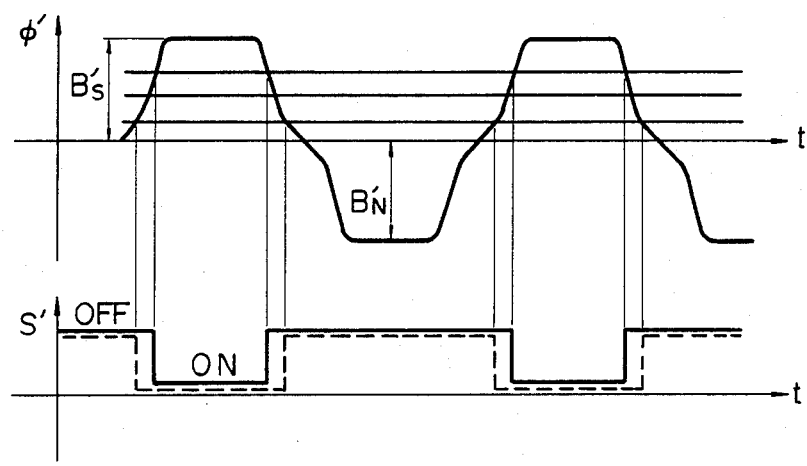
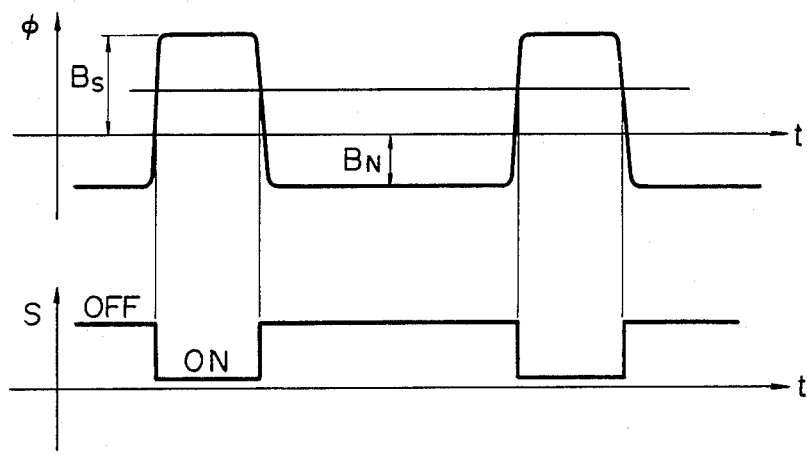

NON-CONTACTING, SPEED-DETECTING DEVICE OF A DIRECT-CURRENT GENERATOR TYPE

DESCRIPTION

1. Technical Field

The present invention relates to a non-contacting, speed-detecting device of a DC generator type, and especially to the above-mentioned device comprising a cylindrical permanent magnet rotor having N and S poles distributing alternatingly in the circumferential direction, a stator facing said permanent magnet rotor, a permanent magnet for location rotating coaxially with said permanent magnet rotor, and magnetic induction switches positioned close to the circumference of said permanent magnet for location.

2. Background of the Invention

A non-contacting, speed-detecting device of the DC generator type of the prior art which is used for detecting the rotating speed of, for example, a rotary machine is illustrated in FIGS. 1(A), (B), and (C). The device of FIG. 1 comprises a cylindrical permanent magnet rotor 1 having N and S poles distributing alternatingly in the circumferential direction, a stator 2 facing said permanent magnet rotor 1, stator windings 4 wound in said stator 2, a permanent magnet 3' for location rotating coaxially with said permanent magnet rotor 1, and magnetic induction switches 5 positioned close to the circumference of said permanent magnet 3' for location so that said magnetic induction switches are actuated in response to the rotating position of said permanent magnet 3' for location, and, accordingly, the desired output signal is obtained.

In the speed-detecting device of FIG. 1, the permanent magnet rotor 1 has two S pole regions and two N pole regions alternating at 90° in the circumferential direction on its lateral circumferential surface. The stator 2 is arranged concentricly around the rotator 1 so that it is close to its lateral circumferential surface. In the stator 2, windings 4 of four phases ($W_1$, $W_2$, $W_3$, and $W_4$) displaced by an electric angle 90° are wound. The permanent magnet 3' for location is mounted on the rotating axis at a distance from the rotor 1 in the axial direction. The permanent magnet 3' for location has an S pole region α on its lateral circumferential surface. Four magnetic induction switches 5 are positioned on the same circle close to the lateral circumferential surface of the permanent magnet 3' for location, and positioned distant from each other. Each of the magnetic induction switches is positioned so that it corresponds to each phase of the stator windings 4 and detects that the S region α of the permanent magnet 3' for location passes close to it. The structure of the permanent magnet 3' for location is illustrated in detail in FIG. 1(C).

The circuit for obtaining a DC voltage output proportional to the rotating speed in accordance with the non-contacting, speed-detecting device of a DC generator type of FIG. 1 is illustrated in FIG. 2. The alternating voltage generated in each phase of the stator windings 4 is switched selectively by the semiconductor switch 8 actuated by the location signal from the magnetic induction switch 5 and is inputted into the operational amplifier 7 through the resistors $R_1$, $R_2$, $R_3$, or $R_4$. The DC voltage output proportional to the rotating speed is obtained at the output terminal 9 of the operational amplifier 7. In FIG. 2, the resistors $R_5$, $R_6$, $R_7$, and $R_8$ are pull-up resistors, $R_9$ is a feed-back resistor, and $R_{10}$ is a reference input resistor.

When the permanent magnet 3' for location is rotating at a constant speed in the speed-detecting device of FIG. 1, the variation of the magnetic flux density in regard to time at the position on which the magnetic induction switch 5 is mounted is illustrated as $\phi'$ in FIG. 3. The above-mentioned magnetic flux density $\phi'$ assumes a maximum value when the S pole region 12 passes the detecting position and assumes a minimum value when the N pole region 13 passes the detecting position. In the transition region 14 between the S pole region 12 and the N pole region 13, the magnetic flux density $\phi'$ changes relatively slowly from a maximum value to a minimum value, or from a minimum value to a maximum value. The actuation state of the magnetic induction switch 5 corresponding to the rotating position of the permanent magnet 3' for location is illustrated as S' in FIG. 3. A device having a Hall effect or another type of device may be used as the magnetic induction switch 5. However, the operating level of such a magnetic induction switch has in general a large variation, a relatively large hysteresis, and a large dependence on external conditions. Therefore, the operating position of the magnetic induction switch 5 will change greatly in accordance with the variation of the operating level, as illustrated by the continuous line and the broken line of S' in FIG. 3.

In FIG. 4, there is illustrated the manner in which the alternating output of each phase $W_1$, $W_2$, $W_3$, and $W_4$ of the stator windings 4 is switched by the locating signal in the circuit of FIG. 2 so that a DC voltage output proportional to the rotating speed is obtained. In each phase voltage wave form $V_1$, $V_2$, $V_3$, and $V_4$, the positive voltage portion P and the negative voltage portion Q have, respectively, trapezoid shapes, and the wave height $V_0$ in the portion corresponding to the upper side of the trapezoid is proportional to the rotating speed. By synthesising the voltage of each phase, the DC voltage output E can be obtained. As illustrated in FIG. 4, the switched portions $a_1$, $a_2$, $b_1$, $b_2$, $c_1$, $c_2$, $d_1$, and $d_2$ of each phase voltage are included in the regions corresponding to the upper side portions of the above-mentioned trapezoids, and the switched regions of the adjacent phases overlap each other.

In addition, in the wave forms of FIG. 4, if the switched regions are too wide, the inclined parts of the trapezoid wave form P will appear in the output wave form. Such a condition is illustrated as $V_b$ and $V_c$ in FIG. 5. Conversely, if the switched regions are too narrow, the regions which are not switched in any phase appears, and in such regions great variations are produced on the output voltage. The above-mentioned condition is illustrated as $V_d$ and $V_e$ in FIG. 5. Thus, since the operating position of the magnetic induction switch 5 detecting the rotating position has a random variation as described above, the result is that a variation having no relation to the rotating speed appears in the output voltage.

As described above, in the non-contacting, speed-detecting device of a DC generator type of a prior art in FIG. 1, a problem exists in that a great random variation occurs in the detection of the rotating position of the rotor, a stabilized DC voltage output proportional to the rotating speed is not obtained, and it is impossible to detect the rotating speed with a high degree of accuracy.

SUMMARY OF THE INVENTION

The main object of the present invention is to eliminate the above-mentioned problem of a device of the prior art and to provide a non-contacting, speed-detecting device of a DC generator type in which the rotating position of the rotor can be detected reliably so that a stabilized DC voltage output proportional to the rotating speed can be obtained and the rotating speed can be detected with a high degree of accuracy.

In accordance with the present invention, there is provided a non-contacting, speed-detecting device of a DC generator type comprising a cylindrical permanent magnet rotor having N and S poles distributing alternatingly in the circumferential direction, a stator facing said permanent magnet rotor, stator windings wound in said stator, a permanent magnet for location rotating coaxially with said permanent magnet rotor, and magnetic induction switches positioned close to the circumferential surface of said permanent magnet for location, wherein said magnetic induction switches are actuated in response to the rotating position of said permanent magnet for location so that the desired output can be obtained, characterized in that the S pole regions and the N pole regions of said permanent magnet for location are formed continuously so that the magnetic field is inverted steeply from one polarity to another polarity and in that the ratio of the widths of the S pole regions and the N pole regions is selected to be a predetermined value other than one.

BRIEF DESCRIPTION OF THE DRAWINGS

FIGS. 1 (A), (B), and (C) illustrate a non-contacting, speed-detecting device of the DC generator type of the prior art.

FIG. 3 illustrates characteristic wave forms of the variations of the magnetic flux density on the permanent magnet for location and the switching signals of the magnetic induction switch in the device of FIG. 1 and in the device according to the present invention.

BEST MODE OF CARRYING OUT THE INVENTION

Figure 2:
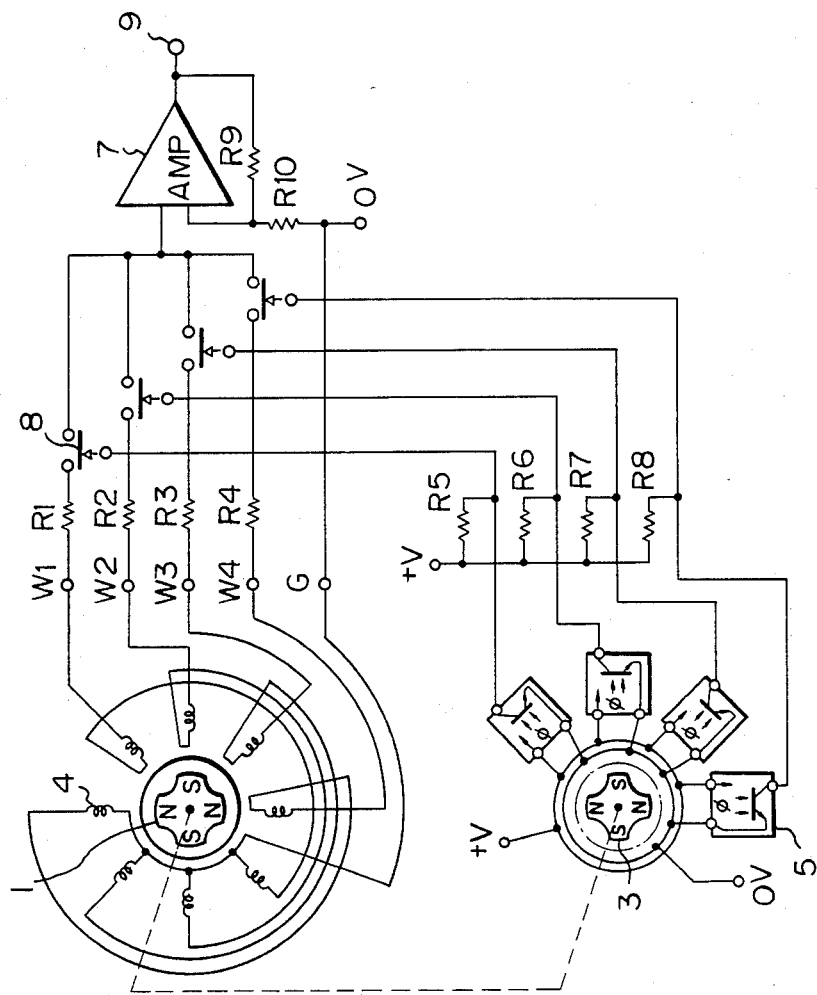
FIG. 2 illustrates a circuit diagram of an output generating circuit for the device of FIG. 1.
Figure 6A:
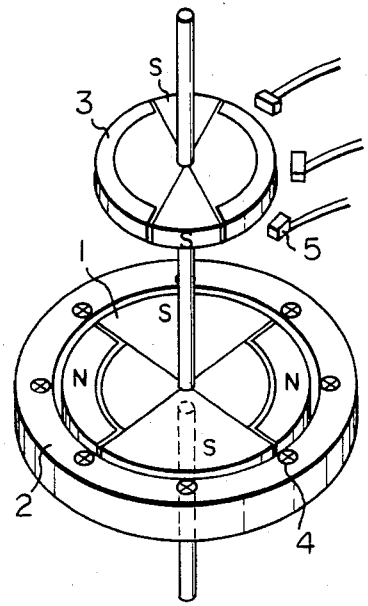
FIGS. 6 (A), (B), and (C) illustrate a non-contacting, speed-detecting device of a DC generator type in accordance with one embodiment of the present invention.
Figure 6B:
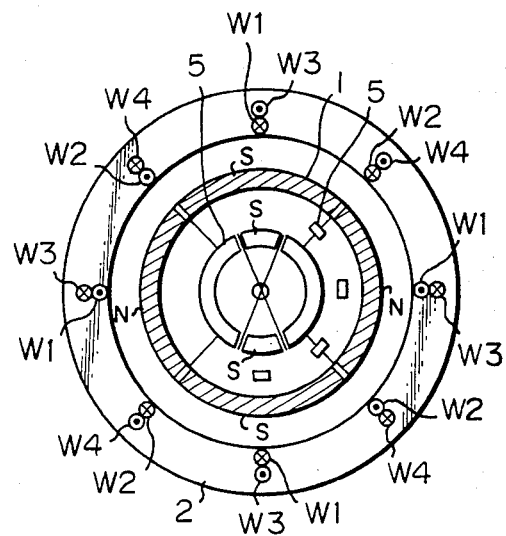
Figure 6C:
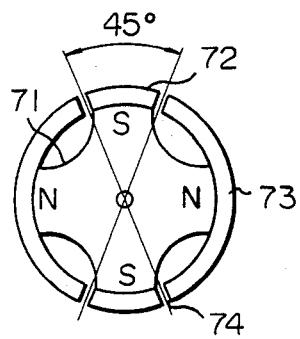

A non-contacting, speed-detecting device of a DC generator type in accordance with one embodiment of the present invention is illustrated in FIGS. 6 (A), (B), and (C). The device illustrated in FIGS. 6 (A) and (B) has the same construction as the device of a prior art illustrated in FIGS. 1 (A) and (B) except for the structure of the permanent magnet 3 for location. The circuit for obtaining a DC voltage output proportional to the rotating speed in accordance with the device of FIG. 6 is the same as that in the device of FIG. 1 (this circuit is illustrated in FIG. 2 as well).

The structure of the permanent magnet 3 for location of the speed-detecting device according to the present invention is illustrated in detail in FIG. 6 (C). The permanent magnet 3 for location in FIG. 6 (C) has a structure in which pole shoes 72, 73 of the S pole and the N pole are attached to the external circumference of a permanent magnet 71 having the same shape as the magnet 3' illustrated in FIG. 1 (C). The pole shoe 72 of the S pole has a width of about 45° in the rotating angle and the pole shoe 73 of the N pole has a width of about 135°. There are provided gaps 74 between the adjacent ends of the pole shoes 72, 73 of the S pole and the N pole.

Figure 4:
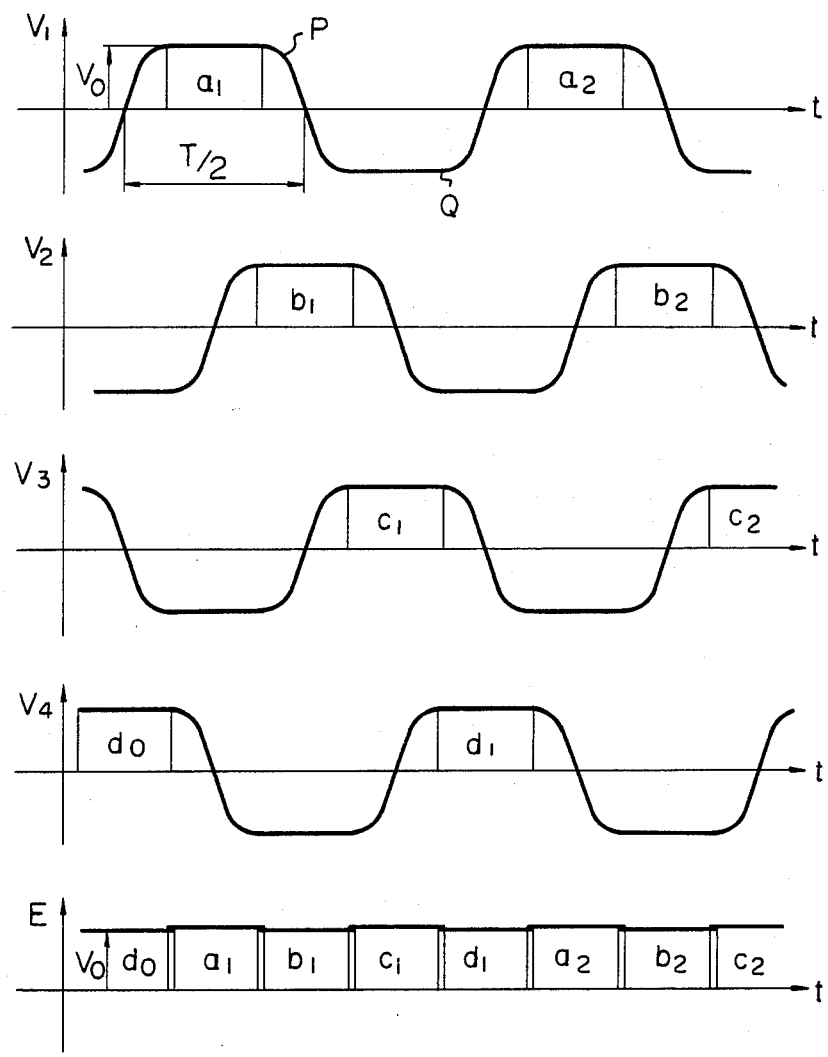
FIG. 4 illustrates output wave forms of the respective phases of the stator windings and an output wave form for detecting the rotating speed in the device of FIG. 1.
Figure 5:
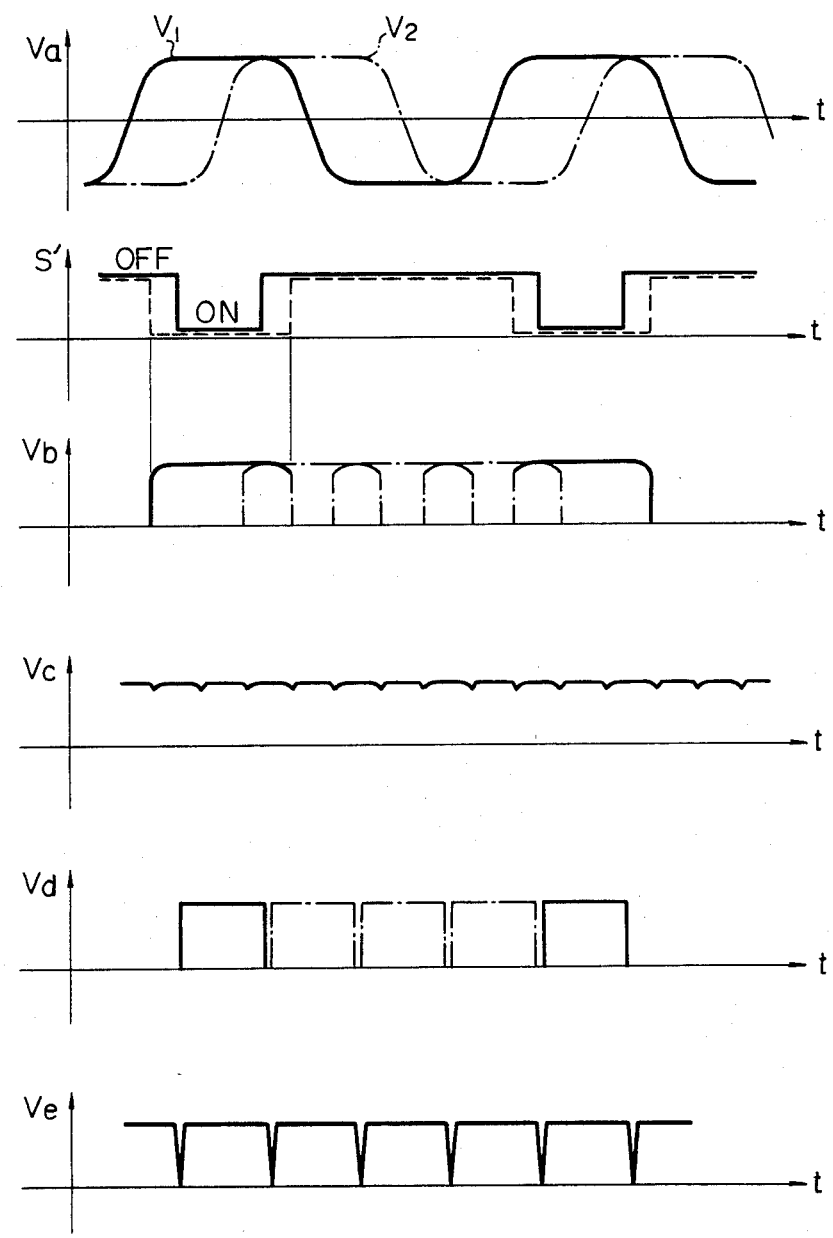
FIG. 5 illustrates wave forms which explain the transformation of the output wave form in response to the change in the operating position of the magnetic induction switch in the device of FIG. 1.

In the case where the permanent magnet 3 for location of the device of FIG. 6 rotates at a constant speed, the variation of the magnetic flux density is $\phi$, as shown in FIG. 3. When the pole shoe 72 of the S pole passes the detecting position the value of the magnetic flux density is a constant value $B_S$, and when the pole shoe 73 of the N pole passes the detecting position the value of the magnetic flux density is a constant value $B_N$. The ratio between the above-mentioned $B_S$ and $B_N$ is approximately inversely proportional to the ratio of the width of the S pole region and the N pole region. When the gap portion 74 passes the detecting position, the value of the magnetic flux density changes rapidly and inverts the polarity from $B_S$ to $B_N$ or from $B_N$ to $B_S$. Thus, the operating position is influenced only a little by the change in its operating level, as illustrated as S in FIG. 3. Therefore, in the device of FIG. 6, as seen from the voltage wave forms in FIG. 4, the magnetic induction switches 5 are reliably actuated so that the voltage of each phase $W_1$, $W_2$, $W_3$, and $W_4$ of the stator windings 4 is switched in the region of the upper side of the trapezoid, and the switched regions of the adjacent phases overlap each other. Accordingly, the output voltage of the device of FIG. 6 becomes a stabilized DC wave form proportional to the rotating speed, which is illustrated as the wave form E in FIG. 4.

Figure 7:
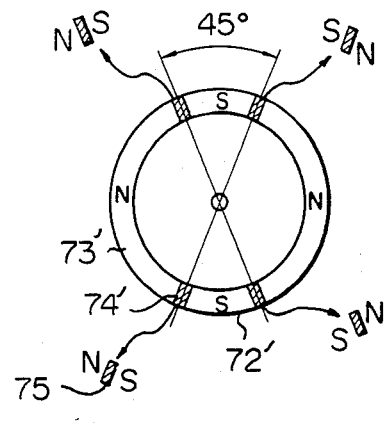
FIG. 7 illustrates a permanent magnet for location of a speed-detecting device in accordance with another embodiment of the present invention.

A permanent magnet for location in the speed-detecting device in accordance with another embodiment of the present invention is illustrated in FIG. 7. In the permanent magnet for location of FIG. 7, the pole shoes 72', 73' of the S pole and the N pole have approximately the same shapes as the pole shoes 72, 73 illustrated in FIG. 6 (C). However, they differ from those of FIG. 6 (C) in that sliced permanent magnets 75 instead of a permanent magnet 71 are inserted into the adjacent portions 74' of the pole shoes 72' and 73'. The polarity of each sliced permanent magnet 75 is arranged in the direction illustrated, i.e. the directions of polarity alternate in adjacent gaps.

According to the present invention, there can be provided a non-contacting, speed-detecting device of a DC generator type wherein by reliably switching the alternating voltage generated in each phase of the stator windings at the desired angular position, a stabilized DC voltage output proportional to the rotating speed can be obtained so that the rotating speed can be detected with a high degree of accuracy.

We claim:

1. A non-contacting speed-detecting device of the direct-current generator type comprising a cylindrical permanent magnet rotor positioned for rotation within a stator, a plurality of stator winding wound on said stator, a permanent magnet for location positioned to rotate coaxially with said permanent magnet rotor and having a plurality of N pole regions and S pole regions, a plurality of magnetic induction switches positioned close to the circumference of said permanent magnet for location to be actuated thereby, said magnetic induction switches being connected respectively to said stator windings to sequentially connect said windings to an output when actuated in response to rotation of said permanent magnetic for rotation so that a stabilized D.C. voltage output proportional to the rotating speed is obtained, wherein the improvement comprises:

said permanent magnet for location being formed so that said N pole regions and said S pole regions alternate continuously around its circumference and have different circumferential widths, and the magnetic field applied to said magnetic induction switches is inverted steeply from one polarity to the other polarity as said magnetic rotates.

2. A non-contacting speed-detecting device as claimed in claim 1, wherein said permanent magnet for location N pole regions and S pole regions alternate circumferentially with transition regions forming depressions between said N pole regions and said S regions, and said N pole regions and S pole regions have pole shoes attached to the external circumference thereof and extending circumferentially to said transition regions, the pole shoes of said N pole regions and the pole shoes of said S pole regions having different circumferential widths and having narrow circumferential gaps therebetween.

3. A non-contacting speed-detecting device as claimed in claim 1, wherein said permanent magnet for location is formed cylindrically with a plurality of pole shoes of alternating greater and lesser circumferential widths formed around its circumference, said pole shoes having narrow circumferential gaps therebetween, and narrow sliced permanent magnets fitted into said narrow gaps and arranged with their N and S poles extending circumferentially and with their polarities alternating in adjacent gaps to form N pole regions and S pole regions having different circumferential widths.

4. A non-contacting speed-detecting device as claimed in claim 1 or claim 2 wherein the ratio of the circumferential widths of said N pole regions and said S pole regions is approximately 3:1.

5. A non-contacting speed-detecting device as claimed in claim 1 or claim 2 wherein the angular circumferential widths of said N pole regions are approximately 135 degrees and the angular circumferential widths of said S pole regions are approximately 45 degrees.

* * * * *